United States Patent [19]
Nilsson et al.

[11] 3,933,181
[45] Jan. 20, 1976

[54] LONG DISTANCE HEATING CONDUIT IN PARTICULAR FOR HOT WATER LINES

[75] Inventors: Erland Nilsson, Torshalla; Lennart Lundbohm, Nacka, both of Sweden

[73] Assignee: Nyby Bruk AB, Sweden

[22] Filed: Apr. 19, 1973

[21] Appl. No.: 352,420

[30] Foreign Application Priority Data
Apr. 20, 1972 Germany............................ 2219228

[52] U.S. Cl.................................. 138/105; 138/111
[51] Int. Cl.² ................................................ F16L 58/00
[58] Field of Search ............ 138/105, 106, 111, 112; 61/72.1, 72.4; 55/138

[56] References Cited
UNITED STATES PATENTS

| | | | |
|---|---|---|---|
| 1,797,443 | 3/1931 | Powell | 138/111 |
| 2,906,294 | 9/1959 | Peterson | 138/106 |
| 2,997,071 | 8/1961 | May | 138/105 |
| 3,150,691 | 9/1964 | Peterson | 138/105 |
| 3,229,023 | 1/1966 | Bolton | 55/158 |
| 3,668,837 | 6/1972 | Gross | 55/158 |
| 3,675,432 | 7/1972 | Keene | 61/71.2 |
| 3,680,364 | 8/1972 | Carrier | 73/73 |
| 3,751,879 | 8/1973 | Allington | 55/158 |

*Primary Examiner*—Herbert Goldstein
*Attorney, Agent, or Firm*—Craig & Antonelli

[57] ABSTRACT

A long-distance heating conduit comprising one or more tubes conveying the heating medium, which tubes are supported in the conduit by support means consisting of an insulating material resistant to compression and surrounded by a heat-insulating material also resistant to compression and enclosed by cover foils having holes, the size and shape of which are dimensioned in such a manner that water substantially cannot penetrate, but that they are permeable to gases and vapors.

32 Claims, 3 Drawing Figures

LONG DISTANCE HEATING CONDUIT IN PARTICULAR FOR HOT WATER LINES

The invention relates to a long-distance heating conduit, in particular for hot water lines, comprising one or more tubes conveying the heating medium, which tubes are supported on support means in the conduit, surrounded by a heat-insulating material, and covered so that they may be weighted from above.

In a known heating conduit of this type, the cavity between the tubes and the waterproof conduit walls made of concrete are filled up with for example an insulation material of light-weight concrete. In this heating conduit, the penetration of moisture has to be absolutely avoided, since moisture once penetrated can be removed from the insulation only in a very long drying time with the known conduit construction method being employed.

It is, however, impossible to keep the conduit impervious continuously, as it may be damaged for example by too great a mechanical load, by accidents, or other hazards. It may also happen that the tubes conveying the heating medium themselves become pervious. These leakages are mostly minute, but still they prevent the insulating materials impregnated by the hot water, for example, from drying again. By this process, not only a great portion of the insulating effect is being lost, but also favorable conditions are produced for damages caused by corrosion by chlorine ions affecting the tubes conveying the heating medium. Such damages may lead to the complete destruction of the lines, which can then be repaired only at a very high expense.

The object on which the present invention is based lies in preventing occurrences of such damages. According to the present invention the support for the tubes conveying the heating medium comprises an insulating material resistant to compression, and the heat-insulating material surrounding the tubes is also resistant to compression and is enclosed by cover foils having holes, which foils touch each other or cover each other on the top side of the insulation layer, but not on the bottom side where apertures or a gap are to be provided, and above the lining of the conduit bed, outside of the cover foils, drain pipes are provided.

The heating conduit according to the invention dries by itself. The hot water tubes are laid in an insulating material, and a waterproof cover foil is provided above the insulating material to prevent water from penetrating from above. However, the insulating material according to the invention is not surrounded by a completely tight waterproof shell, but by a cover foil having small holes. Said holes are so small that they allow the vapor to escape which is formed upon evaporation of water, but on the other hand, they prevent water from penetrating through the holes into the insulating material. Water runs off to the lining of the conduit bed at the sides and reaches there the drain pipes laid at this point. According to the invention, therefore a more or less tight space is formed containing the hot water tubes and the insulating material, a gauge pressure being generated which results in the aforementioned effect of the holes in the foil. The perforated cover foils are applied along the side walls down to the lining of the conduit bed, without, however, covering each other so that the water of condensation formed on the inside of the foils, or other water having penetrated in cases of emergency, can run off freely and can be drained off by the drain pipes.

As an insulating material, balls of expanded clay have proved to be advantageous, which clay has become known under the names "Leca" (light-weight expanded clay aggregates) or "Porondur" (see for example pages 68 and 80 of the book "Leichtbeton", volume I, by Dr.-Ing. Siegfried Reinsdorf, published in 1961). This material combines a good mechanical strength and good insulating qualities against heat losses.

It is expedient to not have the cover foils meet at their ends beneath the tubes, but to leave apertures or a gap so that, upon a great amount of water breaking in, also the water penetrating into the balls of the insulating material may be drained off to the drain pipes.

In another embodiment, the perforated cover foils cover each other or are completely tight also at the bottom. In such a case, either cover foils are used having holes of different sizes, i.e. for example small holes according to the invention on the upper side and at the sides of the insulating material, and larger holes on the bottom side. In cases in which cover foils are used having small holes everywhere, the bottom side has to be provided with large holes, which may be achieved by cutting or punching out.

For example, in the case of inundations or thunder showers, water may penetrate into the insulating material. The embodiment of a heating conduit according to the invention brings about a rapid drying, i.e. only a short period of impregnation occurs, which is endured in particular by chromium steel, but a long period of impregnation as with the known heating conduits does not occur. For the latter, very long periods of drying are necessary in the course of which, as is well known, the attack by corrosion is especially favored.

The essential characteristic of the heating conduit according to the invention is the foil having minute holes. Advantageously, the foil according to the invention consists of a base layer of even thickness provided with minute holes having a diameter of more than 0.002 inches (0.05 mm), preferably, however, of about 0.008 inches (0.2 mm). Advantageously, the foil is provided with longitudinal and transverse reinforcement wires or ribs which, in particular, are only on the one side while the other is completely smooth. Usually, the foil is made of synthetics resistant to aging, but it may also consist of mineral or rock wool or of asbestos or of other fabrics produced of materials resistant in the earth, which fabrics are preferably impregnated, the voids in the fabric corresponding to the holes of the synthetic foil. As the task of said foil having holes consists in keeping dry by evaporation the space in which the tubes conveying the hot water are positioned, naturally every foil material may be used which resists to the attack of moisture and which is resistant to aging, as for example pure aluminium, titanium, silicon alloy steel and the like.

A further characteristic of the present invention consists in that the tube joint connections which are inevitable and occur very often, are executed by means of gluing or welding, the gluing being preferred.

According to a further feature of the invention, the welding is most favorably executed by welding tube sections having a relatively thick wall and being annular in cross section on the ends of the tube (root face welding), the front surfaces being then worked mechanically so that a chamfer is formed which, upon joining together the tubes, makes a V-shaped welding groove then welded in known manner.

The gluing method is characterized in that the preformed tube ends according to the example which tube ends are to be joined, are prepared for gluing and are then protected against contamination by applying protective layers which are removed shortly prior to gluing, thereby guaranteeing a surface quality suitable for gluing. For example, this protective layer consists of a plastic layer pulled off prior to gluing.

The invention will be explained in detail with reference to two embodiments and with the aid of the attached Figures.

Figure 1:
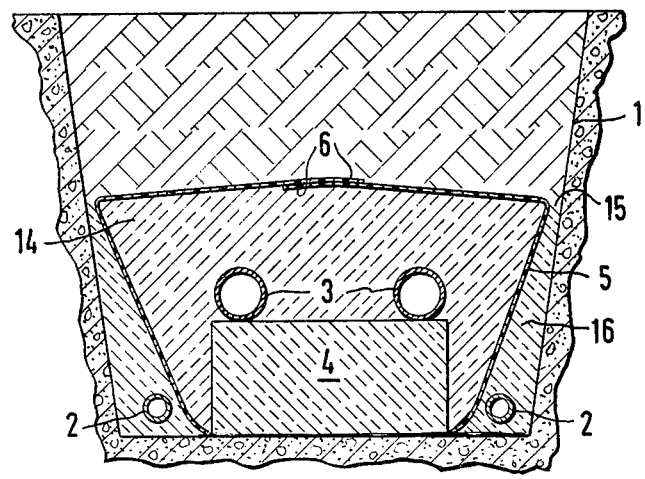
FIG. 1 shows a cross section of a heating conduit with two tubes conveying the heating medium positioned therein.

At the bottom of a heating conduit 1 drain pipes 2 are laid. The tubes 3 conveying the heating medium lie upon a block 4 of insulating material, which may be continuous, but which also may consist of individual cubes into which the insulating material has been pressed. But also a loose fill of the insulating material 14 may be used. On all sides, the tubes 3 are surrounded by insulating material which is enclosed by two synthetic foils 5. On the top side, said foils meet like a roof and cover one another with their edges 6. The foils 5 leave a gap 15 between themselves and the side walls of the conduit 1 which gap is expediently kept open by ledges, laths or the like, and, with their bottom ends, the foils go beneath the block 4 where they do not, however, cover one another. The drain pipes 2 are positioned outside of the foils and may also be covered by insulating material 16. The space above the foils is filled up with excavation material up to ground level. It is also possible to cover the conduit with a highway surface, as the insulating layer may be weighted.

Figure 2:
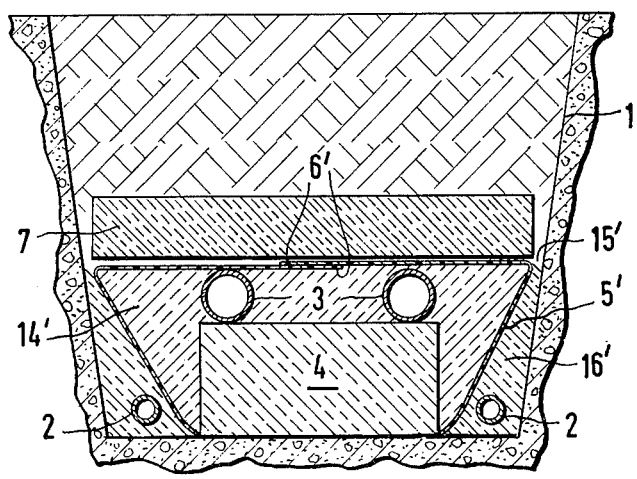
FIG. 2 shows a cross section of a heating conduit with a different arrangement of the insulating material.

In the embodiment according to FIG. 2, the fill 14' of insulating material enclosed by the foils 5' comes up to only about the top edge of the tubes conveying the heating medium. In this case, a plate of heat insulating and water repellant or waterproof material 7 is positioned on top of the fill, which plate has a load capacity sufficient to endure the weights occurring.

Also in the embodiment according to FIG. 2, gaps 15' permeable to water are provided between the side walls of the conduit and the foils 5, through which gaps water may be drained off to the drain pipes 2 which may be covered with an insulating material 16', e.g. Leca balls.

Figure 3:
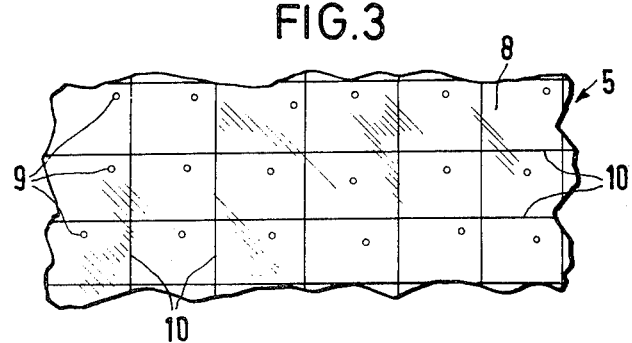
FIG. 3 shows a plan view of a cover foil.

The foils enclosing the heat insulating layer consist, as is shown in FIG. 3, of a base layer 8 advantageously of even thickness, which layer is provided with minute holes 9 of more than 0.002 inches (0.05 mm) diameter and with reinforcement ribs 10 net-like extending over the base layer. The side of the foils provided with the reinforcement ribs engages the insulating layer.

In the case of water breaking in, the water is led along the foils to the conduit walls and between said walls and the foil drawn downwardly to the drain pipes. Also, if water is penetrating from the outside of the conduit wall, the foil serves to drain off the water to the drain pipes. In the case of large amounts of water breaking in, for example upon sudden snow melts, cloudbursts, extensive periods of rain and the like, water may also penetrate the insulating material below the cover foils and come into contact with the warm tubes. Then, the water is evaporated and dissipates up to the foils through the holes of which the vapor may escape upward and to the outside. Thereby, a low gauge pressure is achieved within the covered area. As soon as the large supply of water stops, immediately the drying process starts whereby water coming into contact with the tubes is avoided and thus the precondition for an attack of corrosion. Simultaneously, the full insulation effect is restored. Also the amount of water penetrating in a case of emergency is drained off by the drain pipes.

Apart from the aforementioned advantages of the heating conduit according to the invention, the following is pointed out:

Laying of the tubes may be executed without any auxiliary means, for example cranes, as the tube sections may be laid manually. For handling the known heating conduits also having a good insulating quality, however, cranes have to be used, as the individual sections are very heavy. As a rule, they consist of the protective pipe, the insulating material, and the tube sections. The plant according to the invention is considerably less expensive to construct than the other heating conduits referred to. Conclusively, possible repair works may be executed more easily and more simply than with the known heating conduits.

Once more, it is to be repeated that the heating conduit according to the invention is the only one which may be readily "drowned".

The examples shown serve only to explain, not to limit the invention.

In the drawings and in the specification, there have been set forth preferred embodiments of the invention and, although specific terms are employed, they are used in a generic and descriptive sense only and not for purposes of limitation, the scope of the invention being defined in the claims.

What we claim is:

1. A long-distance heating conduit, in particular for hot water lines, comprising one or more tubes for conveying heating medium, which tubes are supported on supporting means in the conduit surrounded by a first heat insulating material and covered so that they may be weighted from above, wherein the support means for the tubes consists of a second insulating material resistant to compression, wherein the first heat insulating material surrounding the tubes is also resistant to compression and is enclosed by waterproof cover foils having holes the size and shape of which are dimensioned in such a manner that water substantially cannot penetrate, but that they are permeable to gases and vapors, wherein the foils touch or cover each other with their edges on a top side of the first heat insulating material, and wherein the foils extend along side walls of the first heat insulating material and therebeneath in such a manner that they do not cover one another but leave apertures or a gap.

2. A long-distance heating conduit according to claim 1, wherein the holes in the foils have a diameter of more than 0.002 inches.

3. A long-distance heating conduit according to claim 2, wherein the holes have a diameter of about 0.0008 inches.

4. A long-distance heating conduit according to claim 1, wherein the cover foil is provided with holes of different size.

5. A long-distance heating conduit according to claim 1, wherein the portions of the foils positioned on the top side and about halfway down the side walls of the first heat insulating material are provided with holes having a diameter of 0.0002 inches (0.05 mm) to 0.008 inches (0.2 mm), and wherein the holes in the remaining portions of said heat insulating material side walls having an increasing diameter.

6. A long-distance heating conduit according to claim 1, wherein the cover foils are provided with reinforcement means arranged longitudinally and transversely thereof.

7. A long-distance heating conduit according to claim 6, wherein the reinforcement means are wires.

8. A long-distance heating conduit according to claim 6, wherein the reinforcement means are ribs.

9. A long-distance heating conduit according to claim 6, wherein the reinforcement means are attached only to the side of the cover foil facing the insulating material.

10. A long-distance heating conduit according to claim 1, wherein the top side of the first heat insulating material is surrounded by the cover foil and is formed like a roof gable, and wherein gaps are left between the cover foils and conduit side walls.

11. A long-distance heating conduit according to claim 10, wherein securing means are positioned between conduit side walls and cover foils in order to secure the gap.

12. A long-distance heating conduit according to claim 11, wherein the securing means are ledges.

13. A long-distance heating conduit according to claim 11, wherein the securing means are laths.

14. A long-distance heating conduit according to claim 1, at least the first heat-insulating material consists of light-weight expanded clay aggregates.

15. A long distance heating conduit according to claim 14, wherein the expanded clay aggregates consist of a plurality of balls.

16. A long-distance heating conduit according to claim 1, wherein on one side of the cover foil, a bat of heat-insulating material is positioned.

17. A long-distance heating conduit according to claim 16, wherein the bat of material is a member of the group consisting of flexible polyurethane, rock and mineral wool.

18. A long-distance heating conduit according to claim 1, wherein the cover foil consists of a material resistant to aging and unsusceptible to moisture.

19. A long-distance heating conduit according to claim 18, wherein the cover foil consists of a material selected from the group consisting of plastics, aluminum and titanium.

20. A long-distance heating conduit according to claim 1, wherein the tubes conveying the heating medium consist of a material selected from the group consisting of rust-free ferritic chromium steel and chromium molybdenum steel.

21. A long-distance heating conduit according to claim 1, wherein welded tube sections are provided at the ends of the tubes conveying the heating medium, which tube sections have chamfered front surfaces resulting in V-shaped grooves.

22. A long-distance heating conduit according to claim 1, wherein the tube have ends which are protected by protective layers which can be removed prior to joining tubes.

23. A long-distance heating conduit according to claim 1, wherein the tubes include sections which are joined by gluing.

24. An underground hot fluid conveying tube arrangement comprising:
at least one tube means for conveying hot fluid,
at least one cover means surrounding said tube means for protecting said tube means from corrosive media,
wherein at least a portion of said at least one cover means includes holes of sufficient size to be permeable to gases and vapors of said corrosive media to permit passage of said gases and vapors from inside said cover means to the outside thereof, but impermeable to liquid states of said corrosive media to prevent passage of the liquid corrosive media from outside said cover means to the inside thereof,
and insulating means between said tube means and said cover means for insulating said tube means.

25. An arrangement according to claim 24, wherein said at least one cover means is spaced from said tube means.

26. An arrangement according to claim 25, wherein said tube means is supported within conduit means.

27. An arrangement according to claim 26, wherein said cover means is spaced from said tube means such that water between said cover means and tube means is vaporized and passes through said cover means.

28. An arrangement according to claim 27, wherein said conduit means has a bottom and two side walls, wherein drain pipe means are provided near the bottom of said conduit separated from said tube means with said cover means therebetween, and wherein said cover means forms at least one drainage gap with one of said side walls.

29. An arrangement according to claim 28, whereing said cover means includes a top wall, and two generally vertically arranged side walls at least one of said side walls having holes therein which are smaller at an upper end than at a lower end thereof.

30. An arrangement according to claim 24, wherein said portion of said cover means is waterproof.

31. An arrangement according to claim 24, wherein said holes include different sizes.

32. An arrangement according to claim 31, wherein said cover means has a lower portion having some of said holes large enough to permit the passage of liquid therethrough for draining any liquid from inside said cover means to the outside thereof.

* * * * *